United States Patent
Agarwal et al.

(10) Patent No.: US 8,874,784 B2
(45) Date of Patent: *Oct. 28, 2014

(54) SYSTEMS, METHODS, AND COMPUTER READABLE MEDIA FOR CONTROLLING SOCIAL NETWORKING SERVICE ORIGINATED MESSAGE TRAFFIC

(75) Inventors: Devesh Agarwal, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 681 days.

This patent is subject to a terminal disclaimer.

(21) Appl. No.: 12/853,901

(22) Filed: Aug. 10, 2010

(65) Prior Publication Data

US 2011/0038287 A1 Feb. 17, 2011

Related U.S. Application Data

(60) Provisional application No. 61/232,776, filed on Aug. 10, 2009.

(51) Int. Cl.
| | |
|---|---|
| *G06F 15/173* | (2006.01) |
| *H04W 4/00* | (2009.01) |
| *H04W 40/00* | (2009.01) |
| *H04L 12/58* | (2006.01) |
| *H04W 8/02* | (2009.01) |
| *H04L 29/08* | (2006.01) |
| *H04W 8/08* | (2009.01) |

(52) U.S. Cl.
CPC ............... *H04W 8/02* (2013.01); *H04L 67/327* (2013.01); *H04W 8/08* (2013.01); *H04L 51/32* (2013.01); *H04L 12/5895* (2013.01); *H04L 12/588* (2013.01); *H04L 51/20* (2013.01); *H04L 12/5865* (2013.01); *H04L 51/043* (2013.01); *H04L 12/5815* (2013.01)
USPC ........................... 709/238; 455/433; 455/445

(58) Field of Classification Search
USPC ........................... 709/202, 238; 455/417, 433
See application file for complete search history.

(56) References Cited

U.S. PATENT DOCUMENTS

| | | | |
|---|---|---|---|
| 5,579,371 A | 11/1996 | Aridas et al. | |
| 5,724,658 A | 3/1998 | Hasan | |

(Continued)

FOREIGN PATENT DOCUMENTS

| | | |
|---|---|---|
| CN | 1223774 A | 7/1999 |
| DE | 198 05 261 A1 | 8/1999 |

(Continued)

OTHER PUBLICATIONS

Non-Final Office Action for U.S. Appl. No. 12/534,766 (Aug. 5, 2013).

(Continued)

*Primary Examiner* — Jeong S Park
(74) *Attorney, Agent, or Firm* — Jenkins, Wilson, Taylor & Hunt, P.A.

(57) ABSTRACT

Methods, systems, and computer readable media for controlling the delivery of a social networking service originated message directed to a mobile device are disclosed. According to one example, the method performed at a routing node includes intercepting a mobility management message that includes location information associated with a mobile device, storing the location information associated with the mobile device in a location database, and receiving a social networking service originated message directed to the mobile device, wherein the message includes media content. The method further includes extracting the location information associated with the mobile device from the location database and delivering the media content to the mobile device using the extracted location information from the location database.

5 Claims, 9 Drawing Sheets

(56) References Cited

U.S. PATENT DOCUMENTS

| | | |
|---|---|---|
| 5,805,689 A | 9/1998 | Neville |
| 5,905,952 A | 5/1999 | Joensuu et al. |
| 5,915,222 A | 6/1999 | Olsson et al. |
| 6,006,098 A | 12/1999 | Rathnasabapathy et al. |
| 6,047,327 A | 4/2000 | Tso et al. |
| 6,052,591 A | 4/2000 | Bhatia |
| 6,091,958 A | 7/2000 | Bergkvist et al. |
| 6,091,959 A | 7/2000 | Souissi et al. |
| 6,097,960 A | 8/2000 | Rathnasabapathy et al. |
| 6,101,387 A | 8/2000 | Granberg et al. |
| 6,119,014 A | 9/2000 | Alperovich et al. |
| 6,122,510 A | 9/2000 | Granberg |
| H1895 H | 10/2000 | Hoffpauir et al. |
| 6,134,438 A | 10/2000 | Sawyer |
| 6,144,663 A | 11/2000 | Hallenstal |
| 6,151,505 A | 11/2000 | Larkins et al. |
| 6,175,743 B1 | 1/2001 | Alperovich et al. |
| 6,198,923 B1 | 3/2001 | Buettner |
| 6,198,933 B1 | 3/2001 | Lundin |
| 6,219,551 B1 | 4/2001 | Hentilä et al. |
| 6,324,399 B1 | 11/2001 | Salmivalli |
| 6,327,350 B1 | 12/2001 | Spangler et al. |
| 6,381,456 B1 | 4/2002 | Ko |
| 6,381,465 B1 | 4/2002 | Chern et al. |
| 6,400,943 B1 | 6/2002 | Montoya |
| 6,411,632 B2 | 6/2002 | Lindgren et al. |
| 6,456,845 B1 | 9/2002 | Drum et al. |
| 6,505,046 B1 | 1/2003 | Baker |
| 6,505,050 B1 | 1/2003 | Brudos et al. |
| 6,563,917 B2 | 5/2003 | Sabinson et al. |
| 6,567,658 B1 | 5/2003 | Van De Graaf |
| 6,574,481 B1 | 6/2003 | Rathnasabapathy et al. |
| 6,578,085 B1 | 6/2003 | Khalil et al. |
| 6,611,687 B1 | 8/2003 | Clark et al. |
| 6,622,016 B1 | 9/2003 | Sladek et al. |
| 6,650,902 B1 | 11/2003 | Richton |
| 6,662,017 B2 | 12/2003 | McCann et al. |
| 6,735,441 B1 | 5/2004 | Turgeon et al. |
| 6,738,362 B1 | 5/2004 | Xu et al. |
| 6,915,325 B1 * | 7/2005 | Lee et al. ............... 709/202 |
| 6,952,582 B2 | 10/2005 | Murai |
| 6,959,076 B2 | 10/2005 | Chang et al. |
| 6,990,347 B2 | 1/2006 | McCann |
| 7,113,781 B1 | 9/2006 | Allison et al. |
| 7,222,192 B2 | 5/2007 | Allison et al. |
| 7,302,052 B2 | 11/2007 | Fleischer, III et al. |
| 8,644,355 B2 * | 2/2014 | Agarwal et al. ............... 370/522 |
| 2002/0025821 A1 | 2/2002 | Clapton et al. |
| 2002/0026527 A1 | 2/2002 | Das et al. |
| 2002/0037750 A1 | 3/2002 | Hussain et al. |
| 2002/0050927 A1 | 5/2002 | De Moerloose et al. |
| 2002/0057780 A1 | 5/2002 | Gruchala et al. |
| 2002/0065086 A1 | 5/2002 | Vanttinen et al. |
| 2003/0129991 A1 | 7/2003 | Allison et al. |
| 2003/0161457 A1 | 8/2003 | Sabinson et al. |
| 2004/0132449 A1 | 7/2004 | Kowarsch |
| 2004/0203756 A1 | 10/2004 | Lin et al. |
| 2005/0043036 A1 | 2/2005 | Ioppe et al. |
| 2005/0090225 A1 | 4/2005 | Muehleisen et al. |
| 2005/0220288 A1 | 10/2005 | Huey |
| 2007/0032247 A1 | 2/2007 | Shaffer et al. |
| 2007/0293187 A1 | 12/2007 | Pennock |
| 2008/0233935 A1 * | 9/2008 | Garg .......................... 455/417 |
| 2010/0029272 A1 * | 2/2010 | McCann et al. ............. 455/433 |
| 2010/0094703 A1 * | 4/2010 | Bramley et al. ............ 705/14.45 |
| 2010/0178896 A1 * | 7/2010 | Terrero Diaz-Chiron et al. ............. 455/405 |

FOREIGN PATENT DOCUMENTS

| | | |
|---|---|---|
| EP | 0 710 043 A1 | 5/1996 |
| EP | 1 472 809 B1 | 3/2011 |
| WO | WO 99/40748 | 8/1999 |
| WO | WO 00/74409 A1 | 12/2000 |
| WO | WO 01/67782 A2 | 9/2001 |
| WO | WO 03/061159 A1 | 7/2003 |
| WO | WO 2008148421 A1 * | 12/2008 |
| WO | WO 2010/014999 A2 | 2/2010 |

OTHER PUBLICATIONS

Notice of Panel Decision from Pre-Appeal Brief Review for U.S. Appl. No. 12/534,766 (Apr. 17, 2013).

Final Official Action for U.S. Appl. No. 12/534,766 (Oct. 23, 2012).

Non-Final Official Action for U.S. Appl. No. 12/534,766 (Mar. 29, 2012).

Communication regarding the expiry of the time limit within which notice of opposition may be filed for European Application No. 02786968.4 (Feb. 3, 2012).

Communication of European publication number and information on the application of Article 67(3) EPC for European Application No. 09803708.8 (Mar. 23, 2011).

Communication under Rule 71(3) EPC for European Application No. 02786968.4 (Oct. 26, 2010).

Notification of Transmittal of the International Search Report and the Written Opinion of the International Searching Authority, or the Declaration for International Application No. PCT/US2009/052604 (Apr. 12, 2010).

Decision to refuse a European Patent application for European Application No. 01922340.3 (Feb. 11, 2009).

Provision of the minutes in accordance with Rule 124(4) EPC for European Application No. 01922340.3 (Feb. 11, 2009).

Communication pursuant to Article 94(3) EPC for European Application No. 02786968.4 (Sep. 29, 2008).

Summons to attend oral proceedings pursuant to Rule 115(1) EPC for European Application No. 01922340.3 (Jul. 22, 2008).

Supplementary European Search Report for European Application No, 02786968.4 (May 15, 2008).

Communication pursuant to Article 96(2) EPC for European Application No. 01922340.3 (Oct. 23, 2007).

Notice of Allowance and Fee(s) Due for U.S. Appl. No. 10/044,203 (Mar. 13, 2007).

Final Official Action for U.S. Appl. No. 10/044,203 (Aug. 8, 2006).

Notice of Allowance and Fee(s) Due for U.S. Appl. No. 09/649,461 (Jul. 31, 2006).

Decision on Appeal for U.S. Appl. No. 09/649,461 (Jul. 13, 2006).

Examiner's Answer for U.S. Appl. No. 09/649,461 (Feb. 17, 2006).

Non-Final Official Action for U.S. Appl. No. 10/044,203 (Jan. 10, 2006).

Order Returning Undocketed Appeal to Examiner for U.S. Appl. No. 09/649,461 (Nov. 7, 2005).

Non-Final Official Action for U.S. Appl. No. 10/044,203 (Apr. 20, 2005).

Examiner's Answer for U.S. Appl. No. 09/649,461 (Apr. 19, 2005).

Opposition in European Patent Application No. 1 308 054 (Dec. 3, 2004).

Advisory Action for U.S. Appl. No. 09/649,461 (Nov. 18, 2004).

Final Official Action for U.S. Appl. No. 09/649,461 (Mar. 30, 2004).

International Preliminary Examination Report for International Application No. PCT/US01/07828 (Oct. 8, 2003).

Non-Final Official Action for U.S. Appl. No. 09/649,461 (Jul. 28, 2003).

Final Official Action for U.S. Appl. No. 09/649,461 (Apr. 11, 2003).

Notification of Transmittal of the International Search Report or the Declaration for International Application No. PCT/US02/39265 (Feb. 14, 2003).

Notification of European Publication Number and Information on the Application of Article 67(3) EPC for European Application No. 01922340.3 (Nov. 6, 2002).

Non-Final Official Action for U.S. Appl. No. 09/649,461 (Oct. 18, 2002).

Sprague, "Tekelec's Transport Adapter Layer Interface," RFC 3094, pp. 1-106 (Apr. 2001).

"Universal Mobile Telecommunications System (UMTS); Super-Charger Technical Realization; Stage 2", ETSI TS 123 116, V4.0.0 (Mar. 2001). pp. 1-29 (Mar. 2001).

(56) References Cited

OTHER PUBLICATIONS

Stewart et al., "Stream Control Transmission Protocol," RFC 2960, pp. 1-134 (Oct. 2000).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 1 of 4, pp. 1-285).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 2 of 4, pp. 286-571).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000), (Part 3 of 4, pp. 571-857).

"Digital cellular telecommunications system (Phase 2+); Mobile Application Part (MAP) specification (3GPP TS 09,02 version 7.6.0 Release 1998)," ETSI TS 100 974 V7.6.0 (Sep. 2000). (Part 4 of 4, pp. 858-1145).

"3rd Generation Partnership Project; Technical Specification Group Core Network; Gateway Location Register (GLR)—Stage 2 (Release 1999)," 3G TS 23.119 V3.0.0, pp. 1-129 (Mar. 2000).

"Universal Mobile Telecommunications System (UMTS); Supercharger; Stage 2 (3G TS 23.116 version 3.0.0 Release 1999)," ETSI TS 123 116 V3.0.0 (Mar. 2000).

"Digital Cellular Telecommunications System (Phase 2+); Technical Realization of the Short Message Service (SMS); (GSM 03.40 version 7.4.0 Release 1998)," ETSI TsS 100 901, V7.4.0 (Dec. 1999).

Digital Cellular Telecommunications System (Phase 2+); Location Registration Procedures, (GSM 03.12 version 7.0.0 Release 1998), ETSI TS 100 530, V7.0.0 (Aug. 1999).

Bertrand, "Jambala Mobility Gateway-Convergence and Inter-System Roaming," Ericsson Review, No. 2, pp. 89-93 (1999).

Urs, "Roaming Notification and Local Service Control Through Short Message Service," Motorola Technical Developments, vol. 34, pp. 17-19 (Mar. 1, 1998).

A30808-X3245-X32-1-7618 (Information, Network Element, Home Location Register Authentication Center, Siemens 1998).

"IP7 Secure Gateway," Release 1.0, Tekelec, Release Documentation 910-2046-01 Revision A (Nov. 1999).

"Feature Guide Eagle STP," Tekelec, P/N 910-1225-01, Revision B (Jan. 1998).

Yamaguchi et al., "Inter-system mobility and service management in GSM/PDC roaming," IEEE, pp. 694-698 (Nov. 1997).

"Digital Cellular Telecommunications System (Phase 2+); Mobile Application Part (MAP) Specification (GSM 09.02)," ETS 300 974 (May 1997).

A30808-X2769-X7-3-7618) Information, Signaling, Overview CCNC, Siemens AG 1997).

Eagle Feature Guide, P/N 910-1225-01, Revision A, Tekelec, Mar. 1996.

A30808-X3245-X17-1-7618 (Information, Network Element, Mobile-Service Switching Center, Visitor Location Register, Siemens AG 1996).

A30808-X3245-X19-1-7618 (Information, Network Element, Equipment Identity Register, Siemens AG 1995).

A30808-X3245-X18-1-7618 (Information, Netwok Element, Home Location Register, Authentication Center, Siemens AG 1995).

A30808-X2769-X6-1-7618 (Information, Signaling, Overview CCNC, Siemens AG 1995).

Chatras et al., "Mobile Application Part Design Principles," International Switching Symposium, pp. 1-9 (1990).

Extended European Search Report for European Application No. 09803708.8 (Oct. 11, 2013).

First Office Action for Chinese Application No. 200980138920.7 (Apr. 24, 2013).

Notice of Allowance and Fee(s) Due for U.S. Appl. No. 12/534,766 (Mar. 17, 2014).

Rejection Decision for Chinese Application No. 200980138920.7 (May 23, 2014).

* cited by examiner

SYSTEMS, METHODS, AND COMPUTER READABLE MEDIA FOR CONTROLLING SOCIAL NETWORKING SERVICE ORIGINATED MESSAGE TRAFFIC

PRIORITY CLAIM

This application claims the benefit of U.S. Provisional Patent Application Ser. No. 61/232,776, filed Aug. 10, 2009; the disclosure of which is incorporated herein by reference in its entirety.

TECHNICAL FIELD

The subject matter described herein relates to network operator management of social networking service originated message traffic using location database caches, rule databases, and offload gateways. More particularly, the subject matter described herein relates to systems, methods, and computer readable media for controlling social networking service originated message traffic.

BACKGROUND

Presently, there are many social networking, blogging, and microblogging services being created and used by people worldwide. With the proliferation of smart phones and personal digital assistants that allow users to access these services via mobile devices, and with many users being subscribed to unlimited data plans, mobile devices are frequently being utilized to access the aforementioned blogging and social networking services. The increasing use of mobile devices to receive messages relating to these social networking and blogging services is placing a burden stress on existing mobile network equipment.

One such social networking site is Twitter, which is a microblogging social networking service that enables users to send and read other user messages called "tweets." Users may select other users to follow, and when one of these followed users posts a tweet, the following user (i.e., the "follower") is notified of the tweet. Currently, Twitter notifies followers of a followed user's tweet via email. Twitter also allows followers to receive notification of a followed user's tweet via a short message service message (SMS). This means that, for example, each time a tweet is received via a SMS, a home location register (HLR) database must be accessed in order to retrieve the location of the mobile device of the follower in order to route the SMS to the mobile device. As more users subscribe to these types of services, the burden on an HLR increases.

Another problem that arises due to the growing use of social networking and blogging services is the increasing network complexity. Currently, when a social networking message is sent from one of these services, two nodes are necessary to process and deliver the social networking message to a recipient. Specifically, one node is needed to convert the message type and another node is required to deliver the message. For example, with Twitter, a message is received at a destination network, and a short message peer-to-peer (SMPP) gateway is required in order to convert the social networking message from SMPP format to SMS format. After the message is converted to SMS format, a short message service center (SMSC) is required in order to deliver the message.

Accordingly, in light of these disadvantages, there exists a need for improved systems and methods for controlling social networking service originated message traffic.

SUMMARY

The subject matter described herein includes methods, systems, and computer readable media for controlling the delivery of a social networking service originated message directed to a mobile device. One method performed at a routing node includes intercepting a mobility management message that includes location information associated with a mobile device, storing the location information associated with the mobile device in a location database, and receiving a social networking service originated message directed to the mobile device, wherein the message includes media content. The method further includes extracting the location information associated with the mobile device from the location database and delivering the media content to the mobile device using the extracted location information from the location database.

The subject matter described herein for controlling social networking service originated message traffic may be implemented in hardware in combination with software and/or firmware. As such, the terms "function" or "module" as used herein refer to hardware in combination with software and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for controlling social networking service originated message traffic. Reference will now be made in detail to exemplary embodiments of the present invention, examples of which are illustrated in the accompanying drawings. Wherever possible, the same reference numbers will be used throughout the drawings to refer to the same or like parts.

Figure 1:
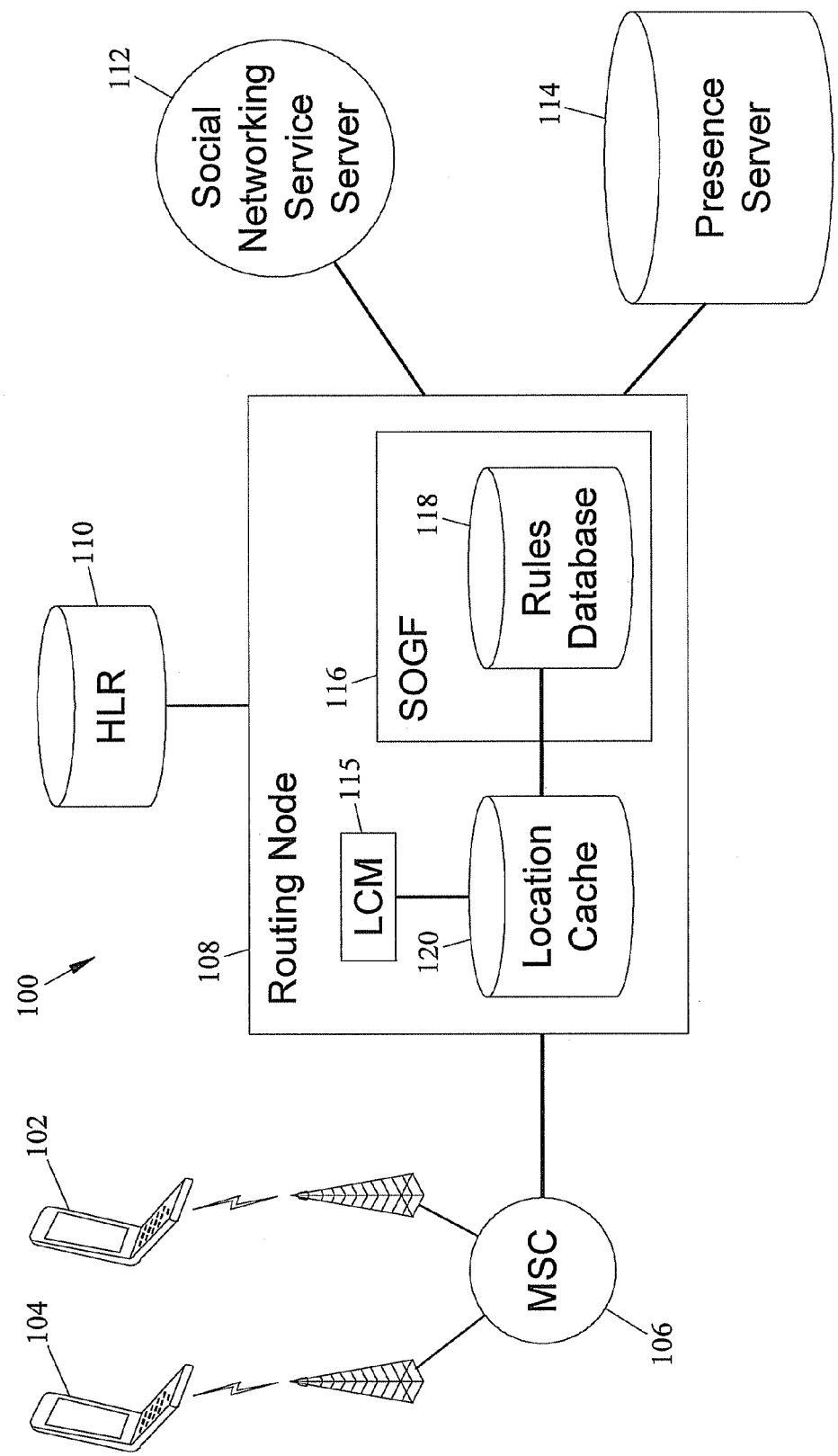
FIG. 1 is a network diagram illustrating an exemplary network for controlling social network message traffic according to an embodiment of the subject matter described herein.

FIG. 1 is an exemplary network diagram of a network 100 that is used to control and manage social networking service originated message traffic (i.e., "social networking messages") via a social networking service offload gateway with location register caching. For example, network 100 includes a routing node 108 that is communicatively connected to a message service center (MSC) 106, a home location register (HLR) 110, a social networking service server 112, and a presence server 114. In one embodiment, routing node 108 may be any message routing node, such as a session initiation protocol (SIP) router, a signal transfer point (STP), a DIAMETER signaling router (DSR), a DIAMETER relay agent, a DIAMETER proxy agent, a signaling gateway, and the like. In one embodiment, routing node 108 may include a social networking service offload gateway function (SOGF) 116, a location caching module (LCM) 115, and a location database 120, which contains location information associated with mobile devices. For example, location database 120 may contain information typically found on a Home Subscriber Server (HSS) or HLR 110.

Network 100 may further include a wireless communication network (e.g., a mobile phone network) that comprises mobile devices 102 and 104 which are communicatively connected to a mobile switching center MSC 106. The wireless communication network may include, but is not limited to, Global System for Mobile Communications (GSM), Interim Standard 41 (IS-41), Session Initiation Protocol (SIP), IP Multimedia Subsystem (IMS), SS7-based 2G, 3G, time division multiple access (TDMA), code division multiple access (CDMA), long term evolution (LTE), and next generation networking (NGN) networks.

In one embodiment, network 100 may also include a SOGF 116. SOGF 116 may be located on routing node 108, or may be physically separate from routing node 108 and may be connected together via any number of connections. SOGF 116 may be associated with a rules database 118. Similarly, rules database 118 may be located on routing node 108 or may be physically separate from routing node 108. Moreover, rules database 118 may be included in SOGF 116 or may be distinct from SOGF 116. Network 100 may also include a presence server 114. In one embodiment, presence server 114 may be may be physically separate from routing node 108 and may be connected to routing node 108 via suitable connections, such as an SS7 or IP connection. Routing node 108 may be connected to social networking service server 112. Social networking service server 112 may be provisioned to send messages destined for a mobile device via network 100.

According to one embodiment of the present subject matter, routing node 108 may be configured to cache location information associated with mobile devices 102 and 104. By caching location information, routing node 108 may eliminate the need to query HLR 110 or HSS to locate a recipient mobile device when a social networking message is directed to mobile device 102 or 104. In one embodiment, LCM 115 in routing node 108 may be configured to intercept a mobility management message from MSC 106 which includes information that indicates the location (e.g., the serving MSC/VLR identifier in GSM networks or the serving mobility management entity (MME)) of a mobile device in network 100. In the example shown in FIG. 1, MSC 106 may send a GSM Mobile Application Part (MAP) UpdateLocation message associated with mobile device 102 to HLR 110 via routing node 108. Alternatively, the mobility management message may include a DIAMETER UpdateLocation request message. In one embodiment, the UpdateLocation message is routed through or intercepted by routing node 108 to HLR 110. During the routing process, LCM 115 may extract and cache location information contained in the UpdateLocation message associated with mobile device 102. After obtaining location information associated with a mobile device, the location information may be stored by routing node 108 in location cache 120.

Social networking servers may be provisioned to send messages destined for at least one mobile device in network 100. For example, social networking server 112 may generate a social networking message destined for mobile device 102 located in network 100. Examples of social networking service originating messages include messages originating from Twitter, Twitpic, Facebook, MySpace, Bebo, and LinkedIn. SOGF 116 may be configured to receive messages from social networking server 112. In FIG. 1, the social networking message may arrive at SOGF 116 which is associated with routing node 108. In one embodiment, the social networking message may be communicated to SOGF 116 via any number of communication protocols, including but not limited to, short message peer-to-peer protocol (SMPP), simple mail transfer protocol (SMTP), hypertext transfer protocol (HTTP), and (MAP).

In one embodiment of the present subject matter, SOGF 116 is configured to receive the social networking message from social networking server 112 and, if necessary, translate or convert the social networking message to a protocol that is suitable for delivering the social networking message to the intended mobile device in the wireless communication network. For example, a message directed to mobile device 102 may be received at SOGF 116 in SMTP format. SOGF 116 may convert the SMTP formatted message to a GSM MAP Forward_ShortMessage (Forward_SM) message that may be accepted by serving MSC 106. SOGF 116 may be further configured to query location cache 120 to obtain location and/or routing information associated with mobile device 102. In this manner, SOGF 116 does not need to query HLR 110, thereby significantly reducing the volume of HLR query and response traffic associated with the delivery of social networking-originated messages to mobile devices of network 100.

Situations may arise in which location cache 120 does not contain location information associated with a destination mobile device. In one embodiment, if SOGF 116 queries location cache 120 and location cache 120 is unable to provide location information for the requested mobile device, SOGF 116 (or location cache 120 in at least one embodiment) may query HLR 110 to obtain the requested mobile device location information. Once obtained, the location information for the mobile device may be stored in location cache 120.

After routing node 108 obtains location information associated with destination mobile device 102, the mobile device location information may be used by routing node 108 to route the Forward_SM message to the destination mobile device 102 in the wireless communication network.

Another feature of the present subject matter is the implementation of a subscriber specific message delivery rules database 118. Rules database 118 may contain rules pertaining to the delivery and management of messages sent from social networking service servers. In one embodiment, SOGF 116 is, upon receiving a social networking message, configured to access rules database 118 in order to determine the manner in which a message received from social networking service server 112 should be delivered to a destination mobile device. Exemplary subscriber-specific message delivery rules contained in rules database 118 may include, but are not limited to, time of day and/or day of week delivery rules, delivery rate limits (e.g., deliver a maximum of 10 messages per hour, etc.), presence-based delivery rules (e.g., deliver via SMS if a mobile device is able to receive SMS messages at this time, otherwise deliver via email, etc.), and the like. Rules database 118 is discussed in greater detail below.

In one embodiment, the message delivery rules in rules database 118 may also specify a preferred network technology in the event where a mobile device is being served in a multi-mode network. For example, a message delivery rule may specify that messages sent to destination mobile device 102 are to have delivery attempted first via IMS. If the mobile device is not available or reachable via IMS, the rule may further state that the message is to be delivered via GSM SMS. In one embodiment, availability of a mobile device via a certain technology or access to a certain network may be determined by querying presence server 114.

In one embodiment, presence server 114 maintains up-to-date data associated with the availability of a user (i.e., a presentity) and associated communication devices (e.g., mobile device 102). The availability information may be associated with one network or technology, or multiple networks or technologies. For example, presence server 114 may contain records detailing whether a mobile device may receive messages via IMS, SMS, IM, or other message delivery formats at any given time. In one embodiment, a presence gateway (not shown) may receive signaling messages, generate presence information regarding non-subscribed-to entities and subscribed-to entities, and forward presence information for these entities to presence server 114.

Figure 2:
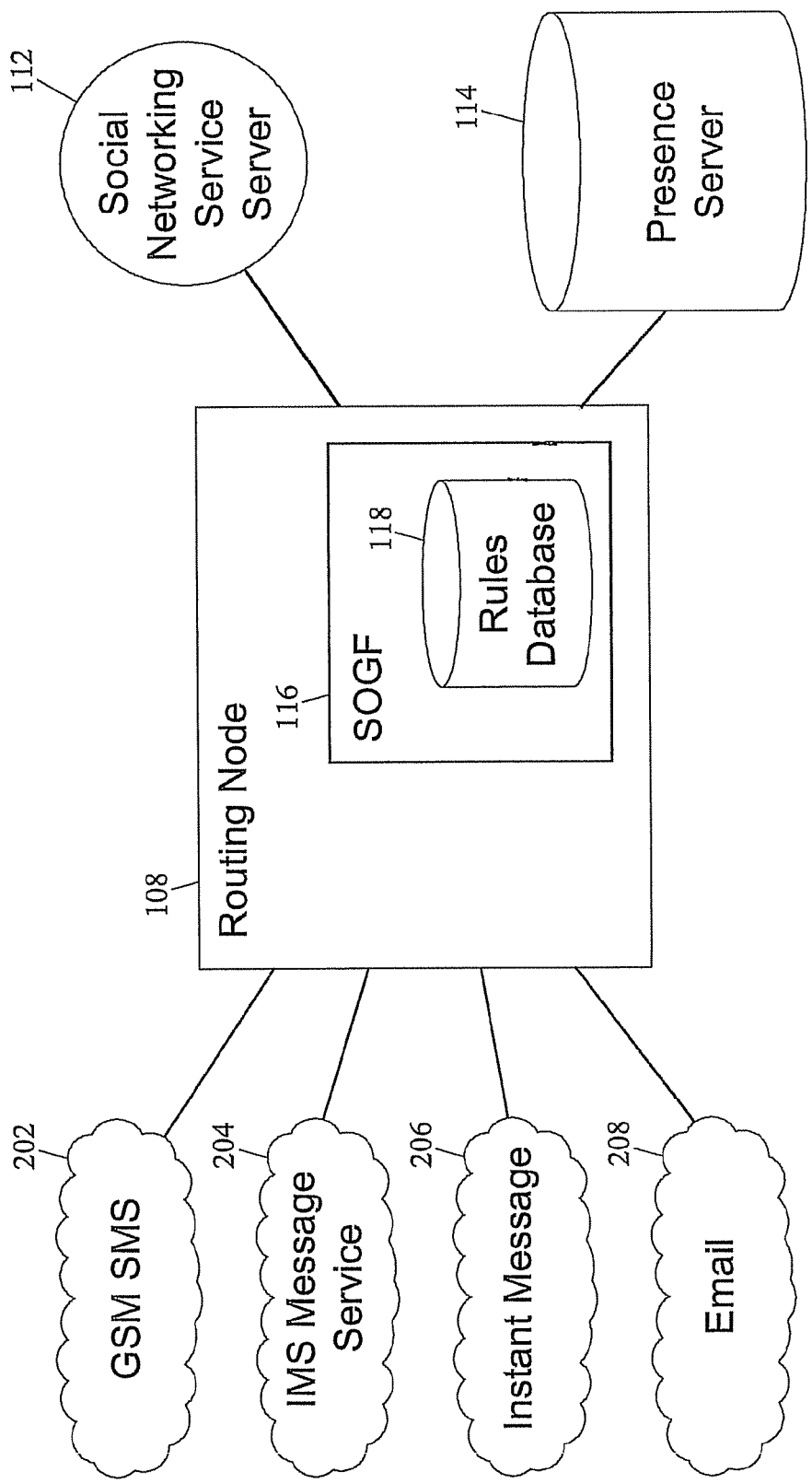
FIG. 2 is a network diagram illustrating presence-based multi-mode delivery of social networking messages according to an embodiment of the subject matter described herein.

FIG. 2 is a network diagram illustrating presence-based multi-mode delivery of social networking messages according to an embodiment of the subject matter described herein. FIG. 2 depicts routing node 108 containing SOGF 116 and configured to communicate with presence server 114. Routing node 108 may be configured to receive or intercept social networking messages from social networking service server 112.

In FIG. 2, SOGF 116 is connected to a plurality of networks that respectively utilize different communication modes. A destination mobile device (not shown) may be connected and may utilize one, some, or all of the modes of communication shown in FIG. 2. In one embodiment, SOGF 116 may be provisioned to convert and send messages received from social network service server 112 to a destination mobile device via any of the communication modes shown, and a user or network operator may provision rules in rules database 118 regarding delivery via these modes. The exemplary communication modes depicted in the networks in FIG. 2 are not intended to be a complete list of acceptable communication modes. In one embodiment, social network service server 112 may send a message directed to a mobile device. SOGF 116 may receive or intercept the social networking message, which may be in any format or protocol, including, but not limited to, SMPP, SMTP, or HTTP. In one embodiment, SOGF 116 may convert the social networking message to a format or protocol based on rules provisioned in rules database 118. For example, the format SOGF 116 may convert the social networking message to GSM SMS format using MAP protocol and then sent the converted message to the intended mobile device via network 202. SOGF 116 may also convert the social networking message to an IMS Message Service format, using, for example, SIP protocol. In this embodiment, the social networking message is converted and sent to the destination mobile device via network 204. Likewise, SOGF 116 may convert the social networking message into an instant message format, using, for example, SIMPLE or XMPP protocol. In this embodiment, the social networking message is converted and sent to the appropriate mobile device via network 206. Additionally, SOGF 116 may convert the social networking message to email format, using, for example, SMTP. In this embodiment, the social networking message is converted and sent to the destination mobile device via network 202. SOGF 116 may be provisioned to convert the received message from any format into an outgoing message of any format. The formats listed above are merely examples and not intended to be a complete list.

In one embodiment, subscriber-specific message delivery rules may be exclusively provisioned and enforced by the network operator. This feature of the present subject matter presents an advantage in that it enables a network operator to control and manage the flow and delivery mode of large volumes of social networking service generated messaging traffic in their network. For example, the network operator may configure SOGF 116 to send messages according to specific rules determined and preferred by the network operator.

In another embodiment, these rules may be provisioned and changed by subscribers. This feature of the present subject matter presents another advantage in that it allows users of social networking services to set rules for delivery of messages. For example, social networking services typically send messages via email, and a user may select if he/she wishes to receive messages via SMS as well. By implementing the present subject matter, a mobile device is able to receive messages in formats other than SMS and email, and a user may set rules regarding the delivery of messages from a plurality of social networking services. Notably, the subscriber only needs to configure his/her delivery setting once for all social networking services subscribed to. In yet another embodiment, these rules may be provisioned and changed by a person who is a non-subscriber and non-network operator, for example a parent or employer.

As mentioned above, SOGF 116 may be configured to monitor and control the number of social networking messages that are delivered to a destination mobile device within a predetermined time interval. For example, a subscriber-specific message delivery rule for destination mobile device 102 may state that destination mobile device 102 is only permitted to receive 50 social networking service-originated text messages within a 24 hours period. In this case, SOGF 116 may facilitate the delivery of up to 50 messages via SMS to the destination mobile device 102 within a 24 hours period and discard any other social networking messages in excess of 50 messages during that same 24 hours period. Subscriber-specific message delivery rules may also be provisioned to combine multiple rules. For example, SOGF 116 may facilitate the delivery of up to 50 messages via SMS to the destination mobile device 102 within a 24 hour period and then deliver or attempt to deliver all other Tweet messages destined for destination mobile device 102 during that same 24 hours period via an alternate communication medium, such as email, instant message, IMS message service, and the like.

Figure 3:
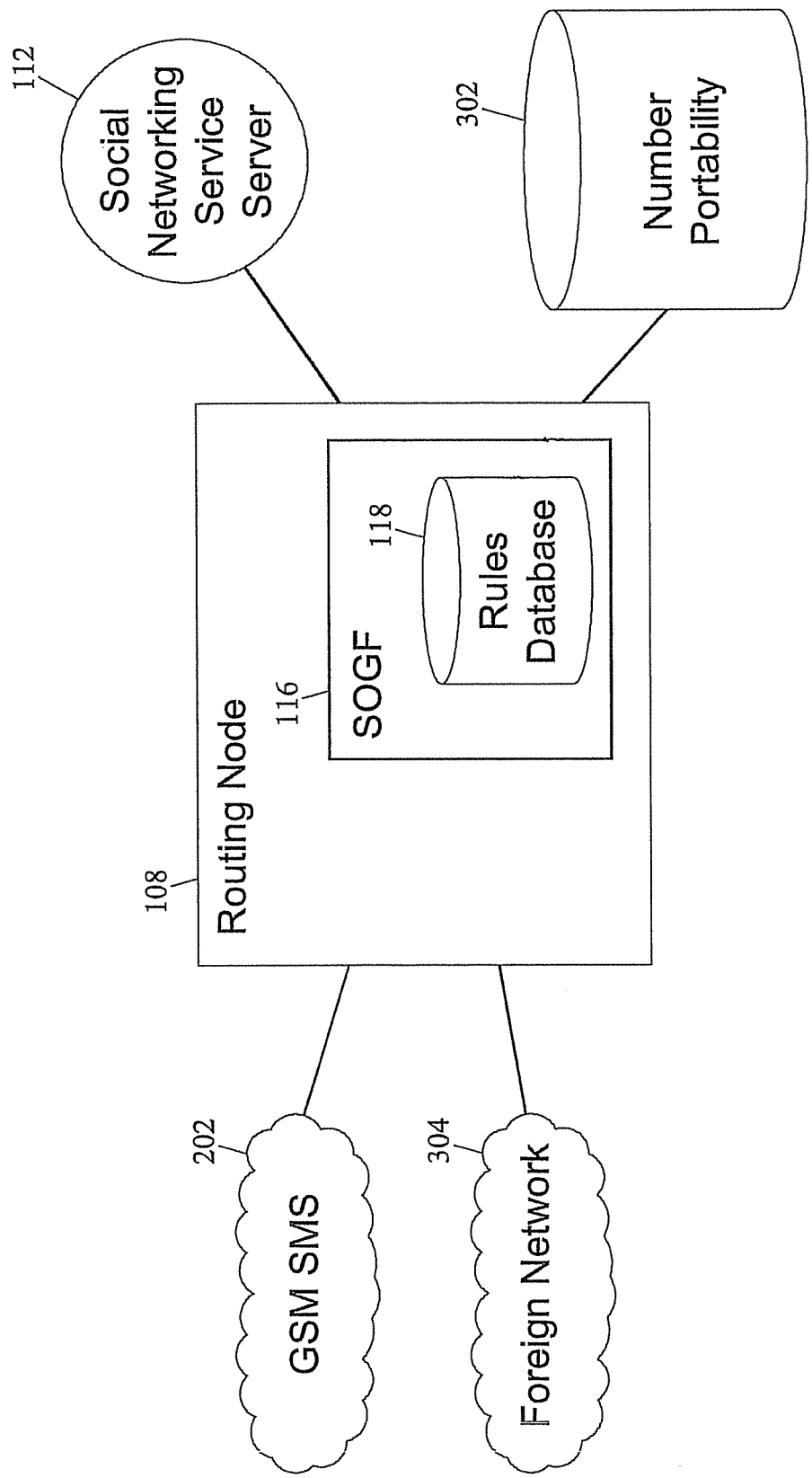
FIG. 3 is a network diagram illustrating number portability checking according to an embodiment of the subject matter described herein.

FIG. 3 is a network diagram illustrating an SOGF that utilizes a number portability database according to an embodiment of the subject matter described herein. In FIG. 3, routing node 108 is provisioned to communicate with a number portability database 302. In this embodiment, rules database 118 is associated with SOGF 116, and SOGF 116 is communicatively connected to a local network 202 and a foreign network 304. In the embodiment in FIG. 3, local network 202 is a GSM network.

In the embodiment of FIG. 3, SOGF 116 is configured to access a number portability database 302 to determine whether a destination mobile device (e.g., mobile device 102 shown in FIG. 1) has ported out of network 202. If it is determined after querying number portability database 302 that the destination mobile device 102 has ported out of the network, SOGF 116 may either forward the social networking message as received to foreign network 304, or it may convert the social networking message to another format before forwarding the social networking message to foreign network 304. For example, SOGF 116 may be configured to determine the type of destination network and convert the social networking message to the format associated with the type of the destination network or may convert the social networking message to a format specified by a rule in rules database 118.

In the embodiment illustrated in FIG. 3, SOGF 116 receives a social networking message from social network service server 112. SOGF 116 may then query number portability database 302 and determine that the number is ported out of the network to foreign network 304. In one embodiment, SOGF 116 may also determine that foreign network 304 is a mobile network configured to receive SMPP messages. SOGF 116 may then convert the social networking message to SMPP format (if it is not already in such format) and forward the message to foreign network 304. In one embodiment, SOGF 116 stores information received from the number portability database 302 in location cache 120 (shown in FIG. 1). By storing information received from number portability database 302 in location cache 120, SOFG 116 does not have to perform another number portability lookup if another message destined for the ported mobile device is received.

Figure 4:
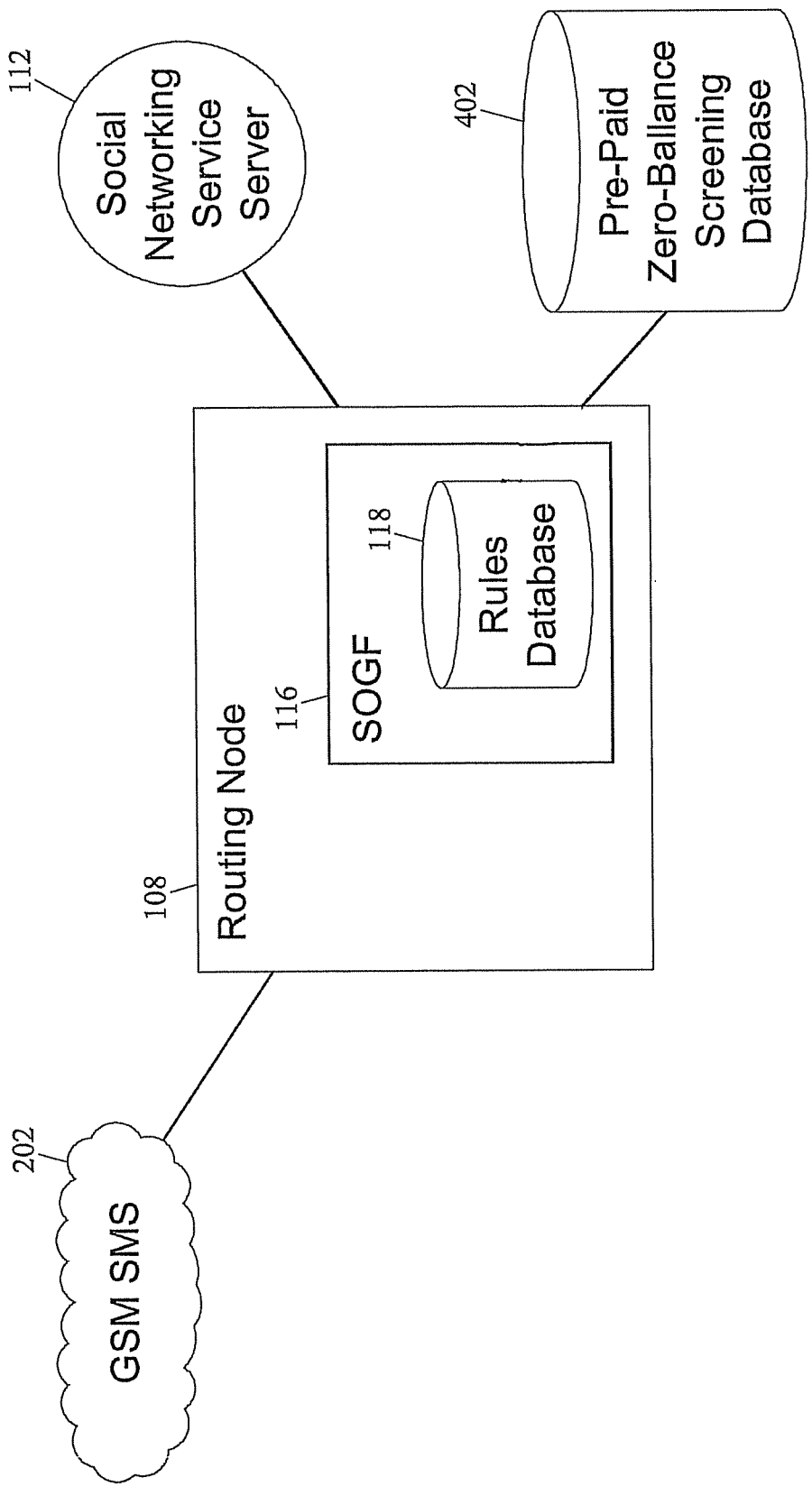
FIG. 4 is a network diagram illustrating pre-paid zero balance screening according to an embodiment of the subject matter described herein.

FIG. 4 is a network diagram illustrating a SOGF that utilizes in a pre-paid zero balance screening database according to an embodiment of the subject matter described herein. In FIG. 4, social networking service server 112 is communicatively connected to routing node 108. Notably, routing node 108 may be provisioned to communicate with a pre-paid zero-balance screening database 402.

In one embodiment, pre-paid zero-balance screening database 402 is provisioned to contain records regarding whether a mobile device has a sufficient account balance to receive messages. For example, a pre-paid user may have expended all the funds in his/her account, thereby resulting in the inability to send and receive SMS messages. In this scenario, pre-paid zero-balance screening database 402 may be configured to store a record containing information that the mobile device has a zero-balance in the account. In another embodiment, pre-paid zero-balance screening database 402 may be configured to store records of mobile devices whose account balance falls below a certain threshold amount. The threshold amount may be configured by either the network provider or the user. For example, a user may desire to not receive messages in the event the account balance drops below a certain threshold level. A user may utilize such a threshold in order to maintain a sufficient a high enough balance on the account so that a phone call may be made in an emergency.

In the embodiment shown in FIG. 4, SOGF 116 is configured to access pre-paid zero-balance screening database 402 to determine whether a destination mobile device has sufficient credit to receive the message via SMS service. If the destination mobile device does have sufficient credit, then the social networking message may be converted to SMS format, for example, and delivered to the destination mobile device via SMS service. If the destination mobile device does not have sufficient credit, then SOGF 116 may execute one or more control actions. Exemplary control actions include, but are not limited to, discarding the message, generating and transmitting to the destination mobile device a notification message that informs the mobile device of the insufficient credit situation, and delivering or attempting to deliver the media content to the mobile device via an alternate communication medium (e.g., email, instant message, etc.). In one embodiment, the media content may include at least one of a text payload, a still image, audio content, and a video. Other control options are available, and control options may be provisioned by the network operator, the user, or a third party, such as an employer or parent. In one embodiment, these control options may be stored on SOGF 116 or in rules database 118.

Figure 5:
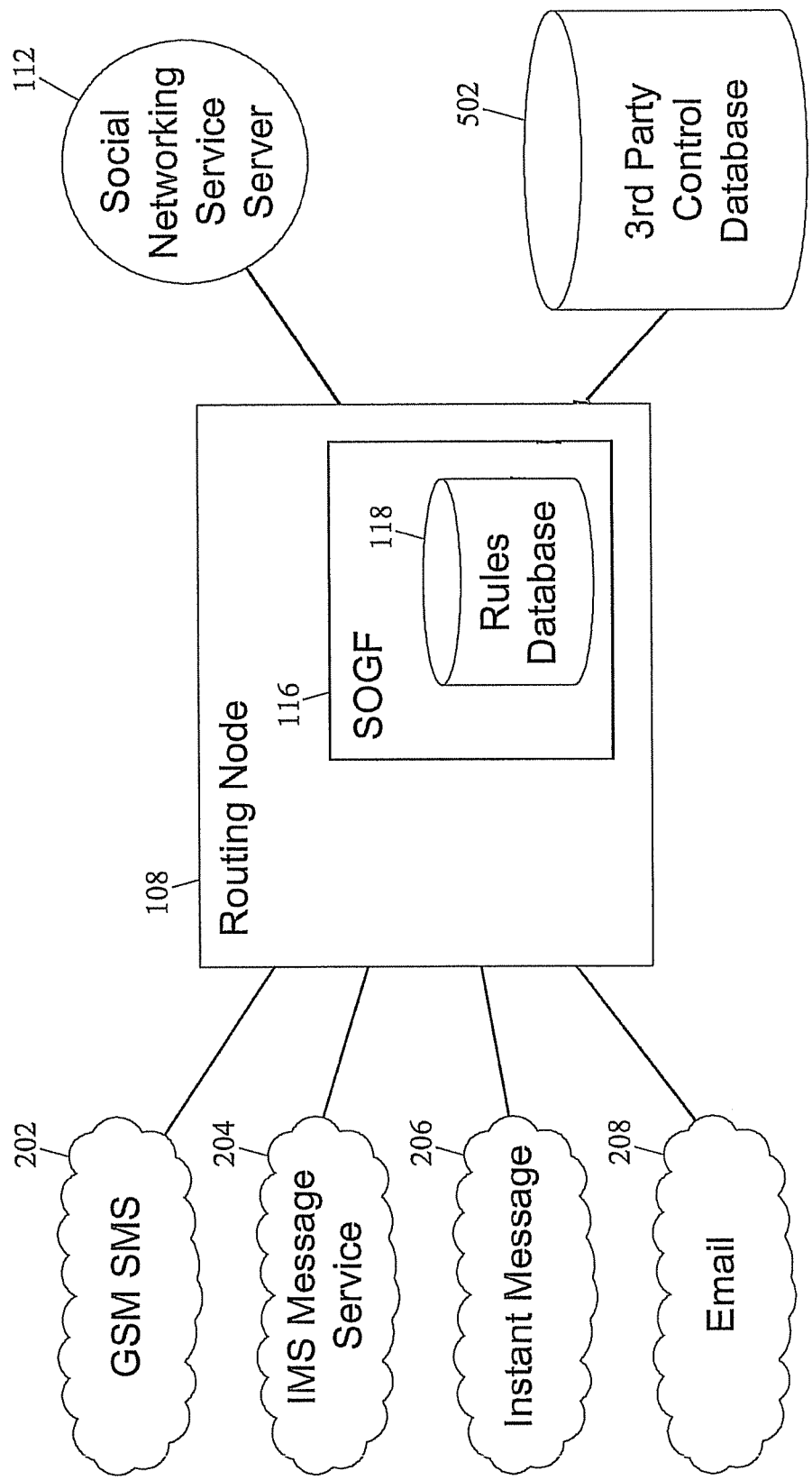
FIG. 5 is a network diagram illustrating parental controls and parental screening according to an embodiment of the subject matter described herein.

FIG. 5 is a network diagram illustrating parental controls and parental screening according to an embodiment of the subject matter described herein. In FIG. 5, SOGF 116 (via routing node 108) is configured to utilize a variety of communication methods such as: GSM 202, IMS 204, instant Message 206, and email 208. In one embodiment, routing node 108 may be communicatively connected to a third party control database 502 that contains rules pertaining to delivery of social network messages to certain parties. In one embodiment, these rules may be set by parents of a user. In one embodiment, these rules may be set by an employer of the user. Depending on hardware configuration, third party control database 502 may either be a standalone database that is separate from other devices or may be contained within rules database 118.

In FIG. 5, social network service server 112 may send a social networking message directed towards a destination mobile device for which third party control and/or content screening rules have been set and stored in third party control database 502. In one embodiment, the social networking message may be routed through or intercepted by SOGF 116 which may reside on routing node 108. Upon receipt of the message, SOGF 116 may query rules database 118 to locate rules pertaining to the destined mobile device using the called party number or some other subscriber identifier or address. In one embodiment, rules database 118 may have a record indicating that third party control database 502 is to be queried. In another embodiment, rules database 118 may contain parental control/content screening rules. In yet another embodiment, SOGF 116 may directly query third party control database 502.

In one embodiment, third party control database 502 may be provisioned with rules that may be used to determine to whether messages should be delivered to the destination mobile device 102. In one exemplary embodiment, the content screening rules may be set by the parents or guardians of children, where the children are subscribers in the mobile communications network and are the intended recipients of social networking messages. In another embodiment, the content screening rules may be provisioned by an employer of an employee, where the employee is a subscriber in the network and is the intended recipient of social networking messages. In yet another embodiment, the content screening rules may be provisioned by a network administrator and pertain to all mobile devices within the network. In yet another embodiment, a set of content screening rules may be provisioned to apply to all users under a certain age.

In one embodiment, content screening rules in third party control database 502 may include blacklist or whitelist type screening rules which respectively specify blocked or allowed message payload content from specified calling party numbers. For example, if a whitelist type screening is utilized, a mobile device may only receive social networking message from calling party numbers which are allowed by rules set on the whitelist. If a blacklist type screening is utilized, a mobile device may receive any social networking message except those from calling party numbers listed on the blacklist. In one embodiment, a third party may provision the whitelist or blacklist content screening rules via a web interface or web-like interface.

In one embodiment, SOGF 116 may receive a social networking message that is intended for a destination mobile device where a third party has subscribed to the third party control/content screening service provided by the network operator. After receiving the messages, SOGF 116 may access the third party control rules database 502 to determine whether the social networking message should be delivered to the destination mobile device. If it is determined that the social networking message should not be delivered to the destination mobile device because of a content control rule specified in database 502, then SOGF 116 may prevent delivery of the social networking message to the destination mobile device. In addition to preventing the delivery of the social networking message to the destination mobile device, SOGF 116 may generate and send to the third party a notification message which indicates that the message was blocked. The manner by which notice is provided to the third party may be set by the third party or network operator. The notification message may include part of or the entire social networking message. SOGF 116 may also log the blocking event for later reporting to or viewing by the parent or guardian.

In one embodiment, third party control database 502 contains screening rules pertaining to the originator of the social networking message. For example, rules may apply to messages from a certain calling party number or identifier, messages from a certain website or domain, or messages from a certain category of websites or domains. In addition, messages may be screened based on language contained within the social networking message.

Figure 6:
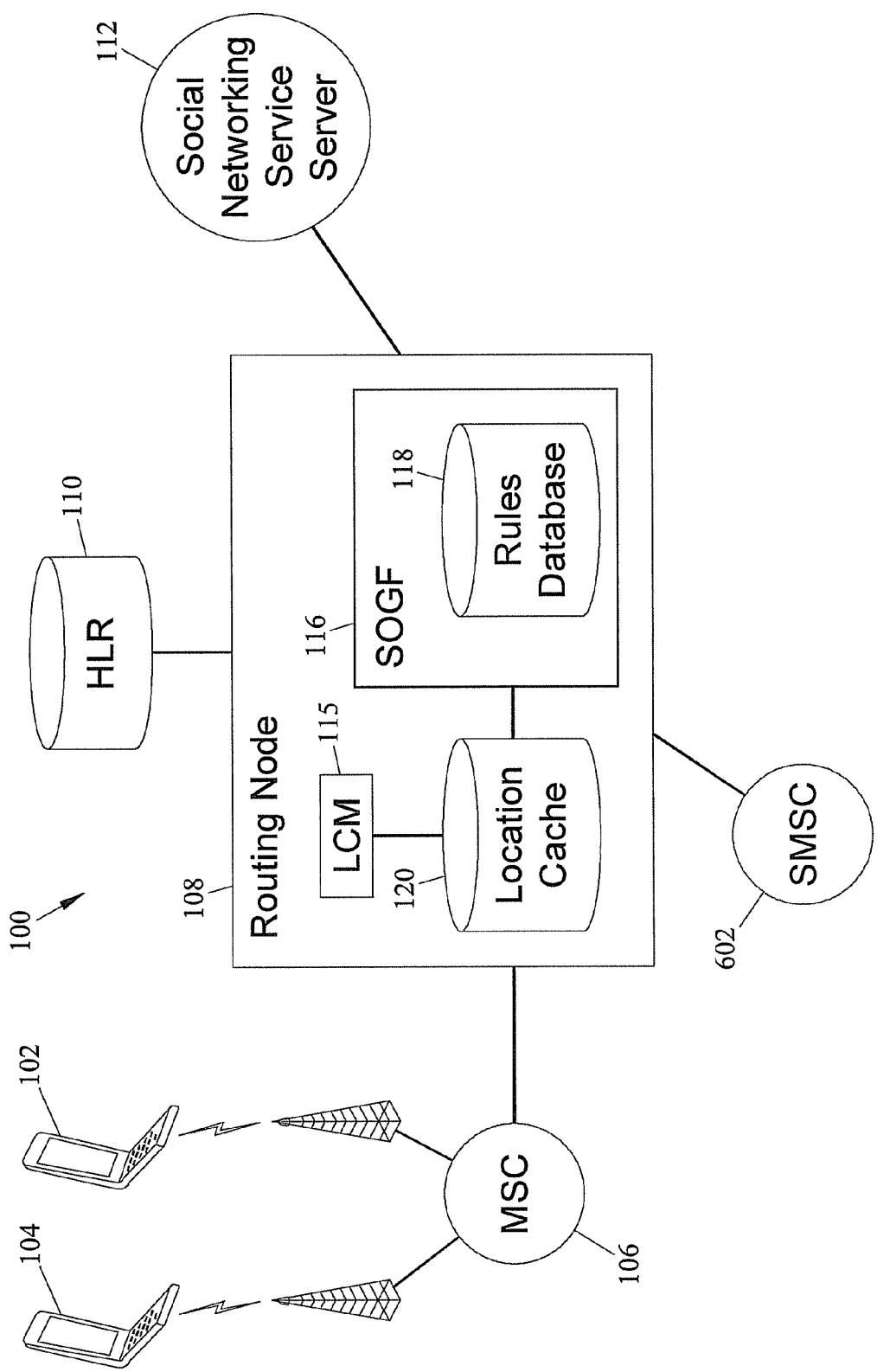
FIG. 6 is a network diagram illustrating a first delivery attempt failure according to an embodiment of the subject matter described herein.

FIG. 6 is a network diagram illustrating a situation where a first delivery attempt fails according to an embodiment of the subject matter described herein. In the embodiment in FIG. 6, social networking service server 112 may generate and launch a social networking message towards destination mobile device 102 which may be located in a wireless communication network. The social networking message may be received or intercepted by SOGF 116 which may be located on or associated with routing node 108. The social networking message may be communicated to SOGF 116 via any number of communication protocols, including but not limited to, SMPP, SMTP, HTTP, and MAP.

In one embodiment, SOGF 116 is configured to receive or intercept the social networking message and, if necessary, translate or convert the social networking message to a protocol that is used by the destination mobile device based on rules in rules database 118. For example, a message for destination mobile device 102 may be received at SOGF 116 in SMTP format. SOGF 116 may further be configured to query location cache 120 to obtain location or routing information associated with the destination mobile device 102 to determine that mobile device 102 is in a GSM network, and convert the SMTP formatted social networking message to a GSM MAP Forward_ShortMessage (Forward_SM) message.

In FIG. 6, the mobile device location information obtained for the mobile device in the location cache 120 (or HLR 110, if necessary) may be used to route the social networking message to the destination mobile device, thereby performing a first delivery attempt. In the embodiment in FIG. 6, the converted message is a GSM MAP Forward_SM message. Notably, situations may arise where the mobile device is no longer connected to MSC 106, but location information in location cache 120 may not yet be updated to represent the mobile device's new location. For example, the mobile device may be in a location without coverage, the destination mobile device may have changed locations and not have had an opportunity to re-register, or the mobile device may have moved to an area served by an MSC for another network which may not provide an update to location cache 120. In the event that SOGF 116 receives a response from MSC 106 indicating that the social networking message could not be delivered, then SOGF 116 is configured to determine and forward the social networking message to a node that is configured to service mobile device 102 (e.g., by querying an HLR or HSS). In the embodiment in FIG. 6, the node configured to service mobile device 102 is SMSC 602. SOGF 116 may send the social networking message in the current format (Forward_SM), or SOGF 116 may convert the social networking message to another format suitable for forwarding through a node configured to service mobile device 102 (e.g. SMPP format). SMSC 602 may then deliver the social networking message to mobile device 102 when the mobile device 102 next becomes available (if it is currently unavailable).

Figure 7:
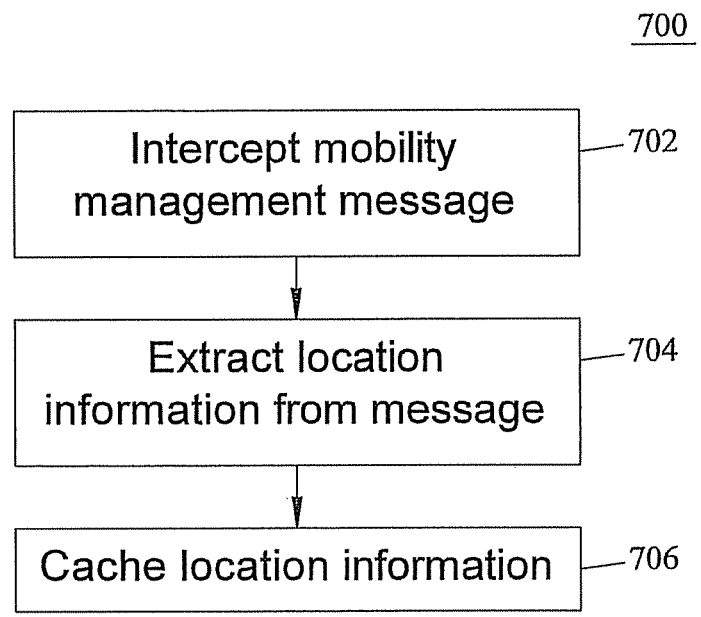
FIG. 7 is a flow chart illustrating an exemplary method for caching location information according to an embodiment of the subject matter described herein.

FIG. 7 is a flow chart illustrating an exemplary method 700 for caching location information according to an embodiment of the subject matter described herein. Method 700 may be performed at any routing node, including but not limited, to a SIP router, an STP, or a DIAMETER network element. In block 702, a mobility management message is intercepted. The mobility management message may be associated with a mobile device (e.g., mobile device 102 in FIG. 1). In one embodiment, the mobility management message is a signaling message from a network node indicating the location of a mobile device within the network. For example, mobility management message may include a GSM MAP UpdateLocation message or a DIAMETER UpdateLocation request message. The message may be directed toward a database containing location information associated with mobile devices within a network, such as an HLR or HSS.

In block 704, location information may be extracted or copied from the message. In one embodiment, SOGF 116 may be configured to extract location information from the GSM MAP UpdateLocation message (or DIAMETER UpdateLocation message). The extracted location information may be associated with a single mobile device or may be associated with more than one mobile device. In one embodiment, location information contains information indicating which MSC serves a particular mobile device (e.g., serving MSC/VLR identifier).

In block 706, the extracted location information may be stored in a location database cache containing location information. The location database may be accessible by SOGF 116 in order to allow SOGF 116 or routing node 108 to route a later social networking message to the same mobile device without having to query an HLR or HSS.

Figure 8:
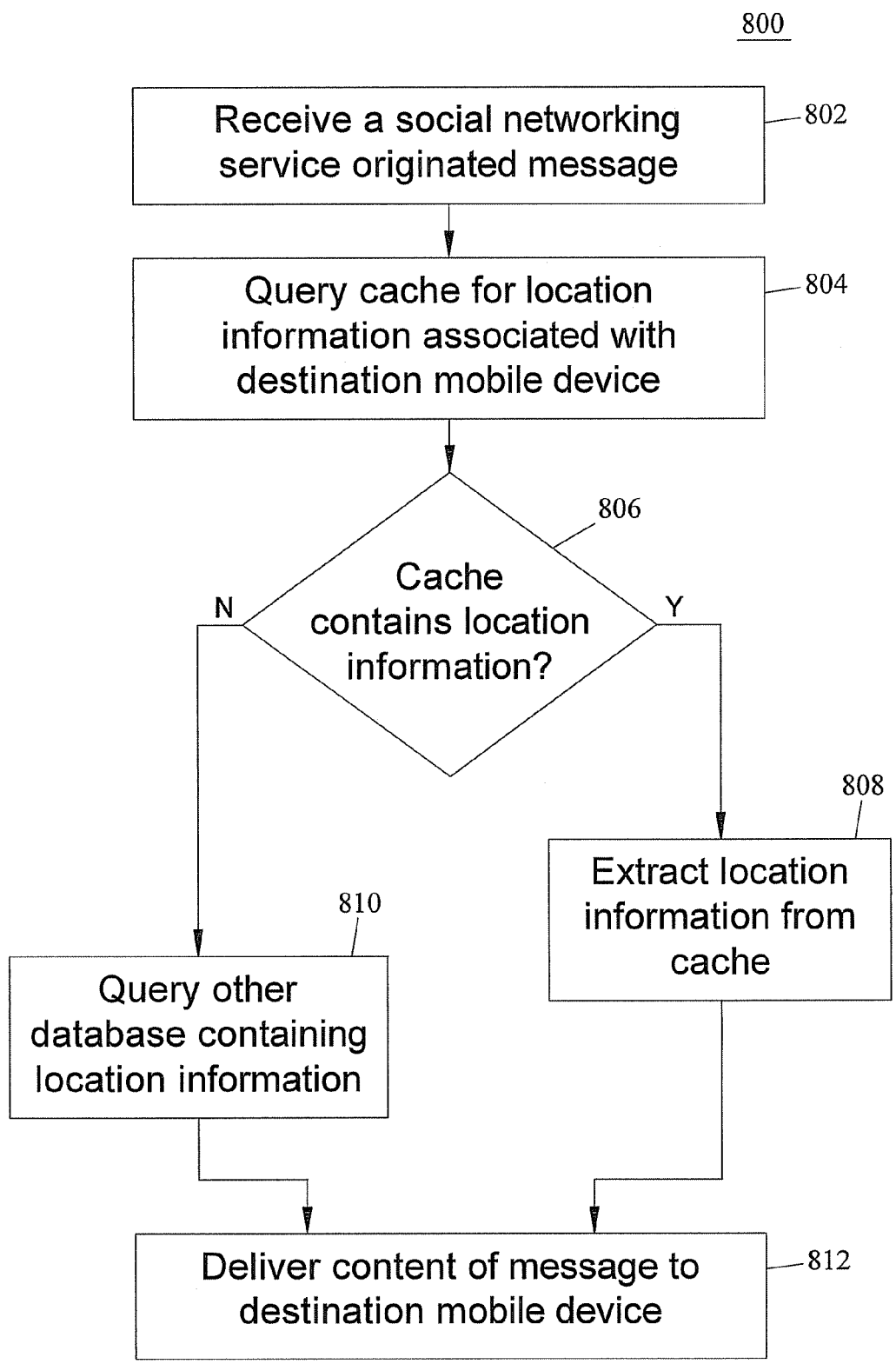
FIG. 8 is a flow chart illustrating an exemplary method for routing social networking service messages using cached location information according to an embodiment of the subject matter described herein.

FIG. 8 is a flow chart illustrating an exemplary method 800 for routing social networking service messages according to an embodiment of the subject matter described herein. In block 802, a social networking service originated message is received. The message may be received by SOGF 116 as shown in FIG. 1. The message may be in any format readable by SOGF 116. For example, message may be in SMPP, SMTP, HTTP, or like format. The message may also be directed toward a destination mobile device (e.g., mobile device 102) within a wireless communications network that is communicatively connected to routing node 106 as shown in FIG. 1.

In block 804, a cache containing location information is queried. For example, a location database 120 may be queried by SOGF 116 or another module on routing node 108. In one embodiment, location database 120 is provisioned by the process described above in method 700.

In block 806, it is determined whether or not location database 120 contains location information associated with the mobile device the message is directed. In one embodiment, data associated with whether location database 120 contains location information is received as a response to the query performed in block 804. In another embodiment, SOGF 116 contains a list of devices which may have location information stored in location database 120 and the decision of block 806 is based on this information.

If location database 120 contains location information associated with a destination mobile device, then method 800 proceeds to block 808. In block 808, location information is extracted from location database 120 containing location information associated with a mobile device the message is destined for. In one embodiment, the location information may be used to route the message to the destination mobile device. By utilizing location information from location database 120, SOGF 116 may be able to route the message to the destination mobile device without having to query a database containing routing information, such as a HLR or HSS. Method 800 continues to block 812.

Returning to block 806, if the cache does not contain location information associated with a destination mobile device, then method 800 proceeds to block 810. In block 810, a database which contains routing and/or location information associated with destination mobile device is queried. In one embodiment, the database may be a HLR (e.g., HLR 110) or an HSS. In one embodiment, the result of the query of the HLR may also be stored in a cache containing location information, such as location database 120. Thus, if the result of the database query is stored in location database 120, then the next time a message is destined for the destination mobile device the HLR or HSS may not need to be queried again as location information may be retrieved from the location database. Method 800 continues to block 812.

In block 812, the content of the message may be delivered to the destination mobile device. The content of the message may be delivered by SOGF 116 without SOGF 116 having to query a routing database, such as a HLR or HSS. In one embodiment, SOGF 116 may convert the message from one format into another format before delivery of the message content. In one embodiment, the message conversion may be based on rules contained within a subscriber-specific message delivery rules database associated with SOGF 116. This delivery may be performed using the location information retrieved from the location database cache.

Figure 9:
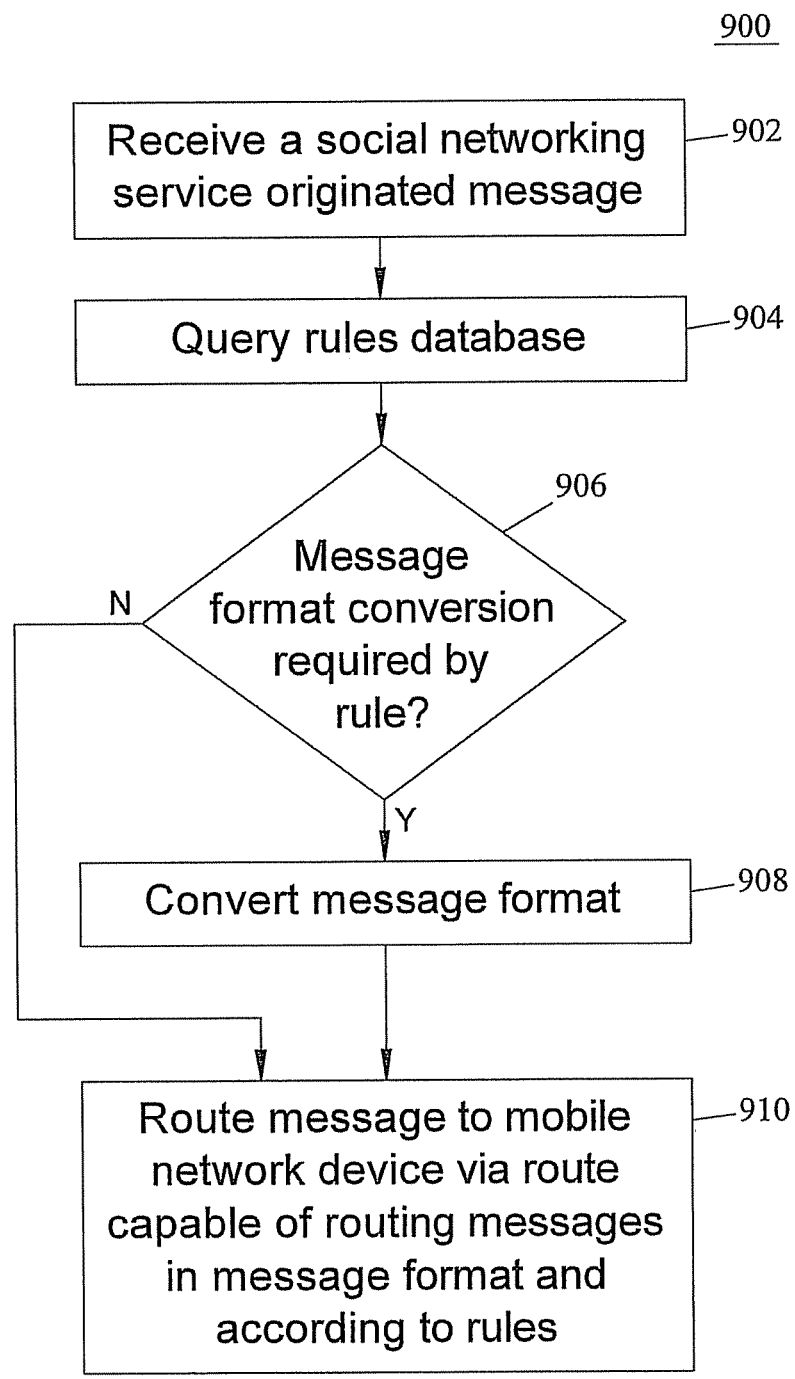
FIG. 9 is a flow chart illustrating an exemplary method for routing social networking messages using rules from a rules database according to an embodiment of the subject matter described herein.

FIG. 9 is a flow chart illustrating an exemplary method 900 for routing social networking service messages using a rules database according to an embodiment of the subject matter described herein. In block 902, a social networking service originated message is received. In one embodiment, the message received at a SOGF may be destined for a mobile device within a network serviced by SOGF 116.

In block 904 a rules database is queried. In one embodiment, rules contained in rules database 118 may pertain to delivery method, delivery format, and/or whether delivery is to be performed for each of a plurality of mobile devices. Rules may include time of day rules and/or day of week delivery rules, delivery rate limits (e.g., only deliver a maximum of 10 messages per hour), presence-based delivery rules (e.g., deliver via SMS if the mobile device is able to accept SMS messages at the current time, otherwise deliver via email), preferred network technology rules (e.g., the mobile device prefers IMS delivery first, and if the destination mobile device is not available via IMS, deliver via SMS), and the like.

In block 906, it is determined whether message format conversion is required by a rule pertaining to delivery of the social networking message. In one embodiment, the determination may be made at SOGF 116. In one embodiment, the rule associated with the destination mobile device may indicate that the format of the social networking message should or should not to be modified.

In block 908, if it is determined in block 906 that message format conversion is required, the format of the social networking message is converted. For example, if a rule specifies that a social networking message is to be delivered via IMS and the message is received in SMPP format, the social networking message may be converted from SMPP format to IMS format. In one embodiment, if a rule states that a social networking message is to be delivered in one format, SOGF 116 may change routing information in the message such that the message may be delivered via a route that supports the indicated delivery format.

In block 910, the message is routed to the destination mobile device via a route capable of routing messages in the format of the social networking message. The social networking message is also routed according to any rules which may be associated with the message. In one embodiment, these rules may reside in rules database 118. In another embodiment, these rules may be accessed from any combination of the rules database and other databases, such as a presence database, a number portability database, a pre-paid zero-balance screening database, and a third party control database.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for controlling the delivery of a social networking service originated message directed to a mobile device, the method comprising:
   at a DIAMETER based routing node:
      intercepting a mobility management message that includes location information associated with a mobile device, wherein the mobility management message includes a DIAMETER UpdateLocation request message directed to a Home Subscriber Server (HSS) from a mobility management entity (MME) serving the mobile device;

storing the location information associated with the mobile device in a location database, wherein the location information is extracted from the DIAMETER UpdateLocation request message by the DIAMETER based routing node;

receiving a social networking service originated message directed to the mobile device, wherein the social networking service originated message includes media content and is generated by a social networking service server;

extracting the location information associated with the mobile device from the location database; and delivering the media content to the mobile device using the extracted location information from the location database and without querying the HSS.

2. The method of claim 1 wherein the DIAMETER based routing node comprises a DIAMETER router, a DIAMETER relay agent, or a DIAMETER proxy agent.

3. A system for controlling the delivery of a social networking service originated message to a mobile device, the system comprising:

a DIAMETER based routing node comprising:

a location caching module for intercepting a mobility management message that includes location information associated with a mobile device and for storing the location information in a location database, wherein the mobility management message includes a DIAMETER UpdateLocation request message directed to a Home Subscriber Server (HSS) from a mobility management entity (MME) serving the mobile device, and for extracting the location information from the DIAMETER UpdateLocation request message; and a social networking services offload gateway function (SOGF) module provisioned for receiving a social networking service originated message directed toward the mobile device, wherein the social networking service originated message contains media content and is generated by a social networking service server, for accessing the location information associated with the mobile device in the location database, and for delivering the media content to the mobile device using the location information and without querying the HSS.

4. The system of claim 3 wherein the DIAMETER based routing node comprises a DIAMETER router, a DIAMETER relay agent, or a DIAMETER proxy agent.

5. A non-transitory computer readable medium having stored thereon non-transitory executable instructions that when executed by the processor of a computer control the computer to perform steps comprising:

at a Diameter based routing node:

intercepting, a mobility management message that includes location information associated with a mobile device, wherein the mobility management message includes a DIAMETER UpdateLocation request message directed to a Home Subscriber Server (HSS) from a mobility management entity (MME) serving the mobile device;

storing the location information associated with the mobile device in a location database, wherein the location information is extracted from the DIAMETER UpdateLocation request message by the DIAMETER based routing node;

receiving a social networking service originated message directed to the mobile device, wherein the social networking service originated message includes media content and is generated by a social networking service server;

extracting the location information associated with the mobile device from the location database; and delivering the media content to the mobile device using the extracted location information from the location database and without querying the HSS.

* * * * *